United States Patent
Jamshidi Nekou et al.

(10) Patent No.: US 10,088,322 B2
(45) Date of Patent: Oct. 2, 2018

(54) TRAFFIC CONTROL DEVICE DETECTION

(71) Applicant: Ford Global Technologies, LLC, Dearborn, MI (US)

(72) Inventors: Homayoun Jamshidi Nekou, Ann Arbor, MI (US); Thomas Edward Pilutti, Ann Arbor, MI (US); Shane Elwart, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 37 days.

(21) Appl. No.: 14/571,651

(22) Filed: Dec. 16, 2014

(65) Prior Publication Data

US 2016/0169684 A1    Jun. 16, 2016

(51) Int. Cl.
| | |
|---|---|
| *G06F 19/00* | (2018.01) |
| *G01C 21/26* | (2006.01) |
| *G01C 22/00* | (2006.01) |
| *G08G 1/01* | (2006.01) |
| *G08G 1/0962* | (2006.01) |
| *G08G 1/0967* | (2006.01) |

(52) U.S. Cl.
CPC .............. *G01C 21/26* (2013.01); *G01C 22/00* (2013.01); *G08G 1/0112* (2013.01); *G08G 1/0129* (2013.01); *G08G 1/0141* (2013.01); *G08G 1/09626* (2013.01); *G08G 1/096716* (2013.01); *G08G 1/096741* (2013.01); *G08G 1/096775* (2013.01)

(58) Field of Classification Search
CPC ........... G01C 21/26; G01C 22/00; G08G 1/01
USPC ....... 701/408, 29.1, 118, 428, 409, 410, 400
See application file for complete search history.

(56) References Cited

U.S. PATENT DOCUMENTS

| | | | |
|---|---|---|---|
| 6,396,395 B1 | 5/2002 | Zielinski et al. | |
| 6,438,491 B1* | 8/2002 | Farmer | B60W 30/16 340/435 |
| 6,466,862 B1* | 10/2002 | DeKock | G08G 1/0104 340/901 |
| 7,194,347 B2 | 3/2007 | Harumoto et al. | |
| 7,433,889 B1* | 10/2008 | Barton | G01C 21/32 |
| 7,617,042 B2 | 11/2009 | Horvitz et al. | |
| 8,188,887 B2 | 5/2012 | Catten et al. | |
| 9,272,709 B2* | 3/2016 | Ben Shalom | B60W 30/00 |
| 2004/0230374 A1* | 11/2004 | Tzamaloukas | G01C 21/28 701/495 |
| 2007/0005609 A1* | 1/2007 | Breed | B60N 2/2863 |

(Continued)

FOREIGN PATENT DOCUMENTS

| | | |
|---|---|---|
| WO | 2009106780 | 3/2009 |
| WO | WO 2010011806 | 1/2010 |

OTHER PUBLICATIONS

GB Search Report 1521602.1 dated Feb. 25, 2016.

(Continued)

*Primary Examiner* — Ronnie M Mancho
(74) *Attorney, Agent, or Firm* — Frank A. MacKenzie; Bejin Bieneman PLC

(57) ABSTRACT

An example vehicle system includes a speed sensor that measures a speed of a host vehicle and a processing device programmed to compare the speed to a speed threshold and determine an amount of time the speed is below the speed threshold. The processing device detects the presence of a traffic control device based on the amount of time the speed is below the speed threshold.

17 Claims, 3 Drawing Sheets

(56) References Cited

U.S. PATENT DOCUMENTS

| | | | | |
|---|---|---|---|---|
| 2008/0012726 | A1* | 1/2008 | Publicover | G08G 1/095 340/932 |
| 2008/0162027 | A1* | 7/2008 | Murphy | B60W 50/14 701/117 |
| 2009/0224942 | A1* | 9/2009 | Goudy | G08G 1/164 340/905 |
| 2010/0228405 | A1* | 9/2010 | Morgal | B62H 3/02 701/2 |
| 2010/0256852 | A1* | 10/2010 | Mudalige | G08G 1/22 701/24 |
| 2012/0095670 | A1* | 4/2012 | Piggott | F02D 17/04 701/112 |
| 2012/0271542 | A1* | 10/2012 | Arcot | G01C 21/3492 701/411 |
| 2012/0303203 | A1* | 11/2012 | Olsen | G08G 1/0133 701/29.1 |
| 2013/0110316 | A1* | 5/2013 | Ogawa | G08G 1/096716 701/1 |
| 2013/0166109 | A1* | 6/2013 | Ginsberg | G08G 1/0967 701/2 |
| 2015/0151725 | A1* | 6/2015 | Clarke | B60W 30/00 701/28 |
| 2015/0154860 | A1* | 6/2015 | Holzwanger | G08G 1/005 340/944 |
| 2015/0170514 | A1* | 6/2015 | Stenneth | G08G 1/0125 701/117 |
| 2015/0202770 | A1* | 7/2015 | Patron | G05D 1/024 700/245 |
| 2015/0234045 | A1* | 8/2015 | Rosenblum | G01S 13/931 342/71 |

OTHER PUBLICATIONS

Stop-Controlled Intersection Safety: Through Route Activated Warning System, http://safety.fhwa.dot.gov/intersection/resources/fhwasa11015/sa11015.cfm, Sep. 30, 2014 (26 pages).

IEEE Xplore Abstract—A real-time histographic approach to road sign recognition, http://ieeexplore.ieee.org/xpl/login.tsp?tp=arnumber=493734&url=http%3A%2F%Fieeexplore.ieee.org%2Fxpls%2Fabs_all.jsp%3Farnumber%3D493734, Apr. 8, 1996 (2 pages).

* cited by examiner

TRAFFIC CONTROL DEVICE DETECTION

BACKGROUND

Drivers constantly encounter traffic control devices when driving on public roads. The locations of traffic control devices change as driving conditions change. For example, the number of traffic lights and stop signs is proportional to the amount of traffic that flows through a particular area. Databases are sometimes used to list the locations of traffic control devices. The databases must be updated each time a traffic control device is placed at or removed from a particular intersection.

DETAILED DESCRIPTION

There are many reasons drivers do not adhere to traffic control devices such as stop signs and traffic lights. For example, a driver may not be aware that a traffic control device has been placed at a particular intersection, causing the driver to inadvertently enter the intersection without right-of-way. Even if a traffic control device is well established at a particular intersection, a distracted driver may not see the traffic control device. Some traffic control devices are hidden by, e.g., trees or bridges.

An example vehicle, referred to below as the "host vehicle", may incorporate a vehicle system that can predict the locations of traffic control devices and warn the driver of the host vehicle of an upcoming traffic control device. An example vehicle system includes a speed sensor that measures a speed of a host vehicle and a processing device programmed to compare the speed to a speed threshold. The processing device is further programmed to determine an amount of time the speed is below the speed threshold. The processing device detects the potential presence of a traffic control device based on the amount of time the speed is below the speed threshold.

For instance, if the host vehicle was travelling less than 25 mph and stopped at an intersection for, e.g., a few seconds, the processing device may determine that the host vehicle was stopped by a stop sign. If, however, the host vehicle was travelling approximately 45 mph and stopped at an intersection for, e.g., 30 seconds or so, the processing device may determine that the host vehicle was stopped by a traffic light. The location of each detected potential traffic control device may be stored in a database, and in some instances, shared with other vehicles. Upon repeated traversals through the location, the existence of the traffic control device is either is supported by the new detection, or not supported if evidence is not detected.

The elements shown may take many different forms and include multiple and/or alternate components and facilities. The example components illustrated are not intended to be limiting. Indeed, additional or alternative components and/or implementations may be used.

Figure 1:
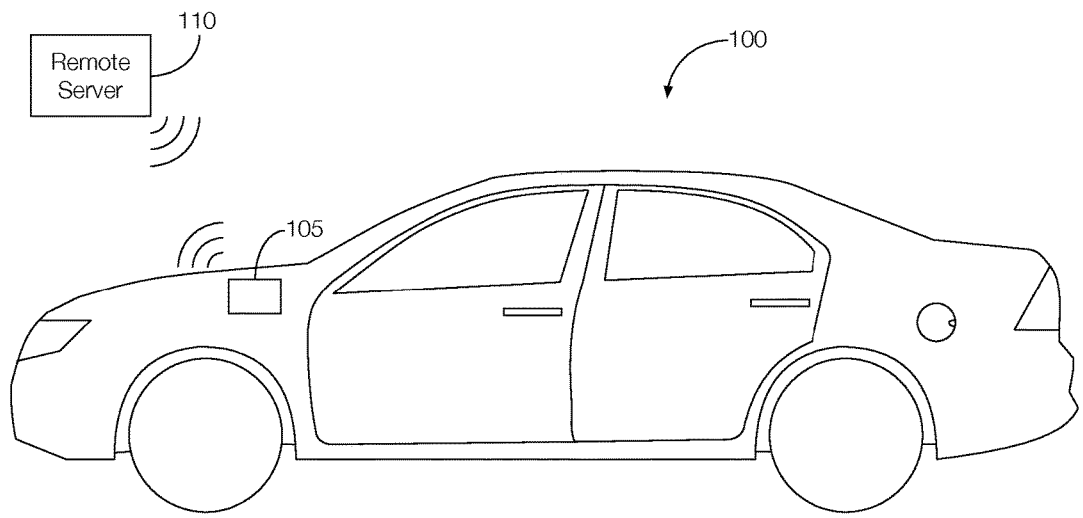
FIG. 1 illustrates an example vehicle with a system that can detect traffic control devices.

As illustrated in FIG. 1, a host vehicle 100 includes a system 105 that can detect the presence of traffic control devices such as stop signs, speed bumps, traffic lights, etc. For example, based on the amount of time the host vehicle 100 is travelling below a particular speed (i.e., a speed threshold), especially if the host vehicle 100 comes to a complete stop, before accelerating, and the recent maximum speed of the host vehicle 100, the system 105 can determine, with some reliability, whether the host vehicle 100 was stopped at a stop sign, traffic light, slowed down because of a speed bump or train tracks, or was stopped by another traffic control device.

In some instances, the host vehicle 100 can communicate with a remote server 110. The remote server 110 may include a location database that that relates the presence of a traffic control device to a particular location. In some instances, the location database further identifies the type of traffic control device at each location. The location database may also or alternatively be stored in the host vehicle 100 in an on-board memory device 130 (see FIG. 2). The system 105 may use the location database to determine whether a traffic control device is along the route of the host vehicle 100. Moreover, the system 105 may update the location database as new traffic control devices are discovered or removed from particular locations. By storing the location database in the remote server 110, the location database may be updated and accessed by multiple vehicles.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode.

Figure 2:
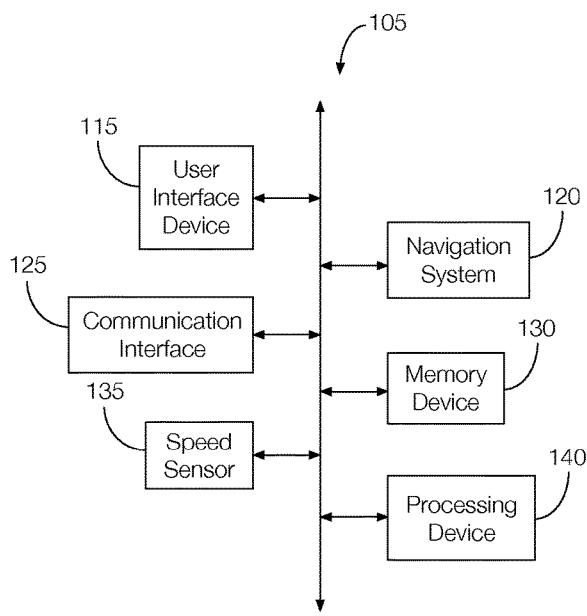
FIG. 2 is a block diagram showing example components of the system that may be incorporated into the vehicle of FIG. 1.

As shown in FIG. 2, the system 105 may include a user interface device 115, a navigation system 120, a communication interface 125, a memory device 130, a speed sensor 135, and a processing device 140.

The user interface device 115 may include a device programmed to present information to a user, such as a driver, during operation of the host vehicle 100. Moreover, the user interface device 115 may be programmed to receive user inputs. Thus, the user interface device 115 may be located in the passenger compartment of the host vehicle 100. In some possible approaches, the user interface device 115 may include a touch-sensitive display screen. The user interface device 115 may be programmed, therefore, to present a traffic control alert to a driver of the host vehicle 100. The traffic control alert may indicate the presence of an upcoming traffic control device along the route of the host vehicle 100. Thus, using the user interface device 115, the driver of the host vehicle 100 may be warned of an upcoming traffic control device.

The navigation system 120 may be configured to determine a current location of the host vehicle 100. The navigation system 120 may include a Global Positioning System (GPS) receiver configured to triangulate the position of the vehicle relative to satellites or terrestrial based transmitter towers. The navigation system 120, therefore, may be configured for wireless communication. The navigation system 120 may be further configured to develop routes from the current location to a selected destination, as well as display a map and present driving directions to the selected destination via, e.g., a user interface device 115. In some instances, the navigation system 120 may develop the route according to a user preference. Examples of user preferences may include maximizing fuel efficiency, reducing travel time, travelling the shortest distance, or the like.

The communication interface 125 may be configured to facilitate wired or wireless communication between the components of the host vehicle 100 and other devices, such as the remote server 110 or even another vehicle when using, e.g., a vehicle-to-vehicle communication protocol. The communication interface 125 may be configured to receive messages from, and transmit messages to, a cellular provider's tower and the Service Delivery Network (SDN) associated with the vehicle that, in turn, establishes communication with a user's mobile device such as a cell phone, a tablet computer, a laptop computer, a fob, or any other electronic device configured for wireless communication via a secondary or the same cellular provider. Cellular communication to the telematics transceiver through the SDN may also be initiated from an internet connected device such as a PC, Laptop, Notebook, or WiFi connected phone. The communication interface 125 may also be configured to communicate directly from the vehicle to the user's remote device or any other device using any number of communication protocols such as Bluetooth®, Bluetooth® Low Energy, or WiFi. An example of a vehicle-to-vehicle communication protocol may include, e.g., the dedicated short range communication (DSRC) protocol. Accordingly, the communication interface 125 may be configured to receive messages from and transmit messages to a remote server 110 or other vehicles.

The memory device 130 may include any device that can store data in digital form. The memory device 130 may include the location database, discussed above, that relates the presence of a traffic control device to a particular location. In some instances, the location database further identifies the type of traffic control device at each location. The memory device 130 may make the information stored in the location database accessible to other components of the system 105, such as the user interface device 115, a navigation system 120, a communication interface 125, or processing device 140.

The speed sensor 135 may include any number of devices configured to measure a speed of the host vehicle 100. The speed sensor 135 may measure the speed of the host vehicle 100 based on outputs from other sensors such as the speedometer, a wheel speed sensor 135, a sensor measuring engine shaft rotations, etc. Alternatively, the speed sensor 135 may calculate the speed of the host vehicle 100 based on, e.g., signals output by the navigation system 120. Regardless of how the speed of the host vehicle 100 is determined, the speed sensor 135 may output a speed signal representing an instantaneous speed of the host vehicle 100.

The processing device 140 may include a computing device programmed to compare the instantaneous speed represented by the speed signal to a speed threshold. If the speed of the host vehicle 100 falls below the speed threshold, the processing device 140 may begin incrementing a counter at period intervals. The processing device 140 may cease counting when the instantaneous speed exceeds the speed threshold. The processing device 140 may be programmed to determine whether a traffic control device is present from the amount of time that the instantaneous speed of the host vehicle 100 was below the speed threshold. The processing device 140 may further consider the recent maximum speed of the host vehicle 100 when determining the type of traffic control device. For example, if the host vehicle 100 stopped at an intersection for a few seconds, and the recent maximum speed of the host vehicle 100 was at or below 25 mph, the processing device 140 may be programmed to determine that the host vehicle 100 stopped at a stop sign. If the host vehicle 100 stopped at an intersection for a longer period of time, such as at least 20 seconds, and was recently traveling faster than, e.g., 30 mph, the processing device 140 may be programmed to determine that the vehicle stopped at a traffic light.

Using outputs of other sensors, the processing device 140 may be programmed to detect other types of traffic control devices. For example, the processing device 140 may determine whether the host vehicle 100 slowed down because of a speed bump based on, e.g., the output of an accelerometer. The processing device 140 may determine whether the host vehicle 100 slowed down due to railroad tracks based on, e.g., the output of the navigation system 120.

When the presence of a traffic control device has been detected, the processing device 140 may be programmed to update the memory device 130, and in particular the location database, with the presence of the traffic control device, the location of the host vehicle 100 at the time the traffic control device is detected, and the type of traffic control device. Thus, the processing device 140 may associate the presence of a traffic control device to the present location of the host vehicle 100 at the time the host vehicle 100 was stopped. To prevent incorporating false positives into the location database—that is, locations where no traffic control device actually exists—the processing device 140 may be programmed to only update the location database after a particular traffic control device has been identified at a particular location a minimum number of times. For instance, the processing device 140 may be programmed to update the location database only after a traffic control device has been observed at a particular location, e.g., at least ten times. Therefore, as discussed in greater detail below, the location database may include a histogram record. Aggregating the data into a histogram record may prevent the location database from being immediately updated when a new traffic control device is detected, or an existing traffic control device is not detected, unless the change has been noted on multiple occasions.

Moreover, as the host vehicle 100 approaches a previously observed traffic control device, the processing device 140 may command the user interface device 115 to present the traffic control alert to the driver. In some instances, the processing device 140 may command the user interface device 115 to prompt the driver to confirm whether or not the traffic control device actually exists at the detected location. The response provided by the driver may further help prevent false positives from being incorporated into the location database.

If the location database is also or alternatively stored in the remote server 110, the processing device 140 may transmit updates to the remote server 110 via the communication interface 125. Further, the processing device 140 may be programmed to query the location database stored in the remote server 110 for updates including traffic control devices at particular locations detected by other vehicles. In some instances, the processing device 140 may be programmed to query the location database any time the host vehicle 100 approaches a particular intersection. The processing device 140 may further command the communication interface 125 to transmit the amount of time the host vehicle 100 was stopped at the location to the remote server 110. In some instances, the processing device 140 may further command the communication interface 125 to transmit the recent maximum speed of the host vehicle 100. The remote server 110 may use such information, as well as information received from other vehicles, to determine whether a traffic control device is present at a particular location. Moreover, the remote server 110 or processing device 140 may use, e.g., the posted speed limit instead of the recent maximum speed of the host vehicle 100 to determine the type of traffic control device present at a particular location.

Figure 3:
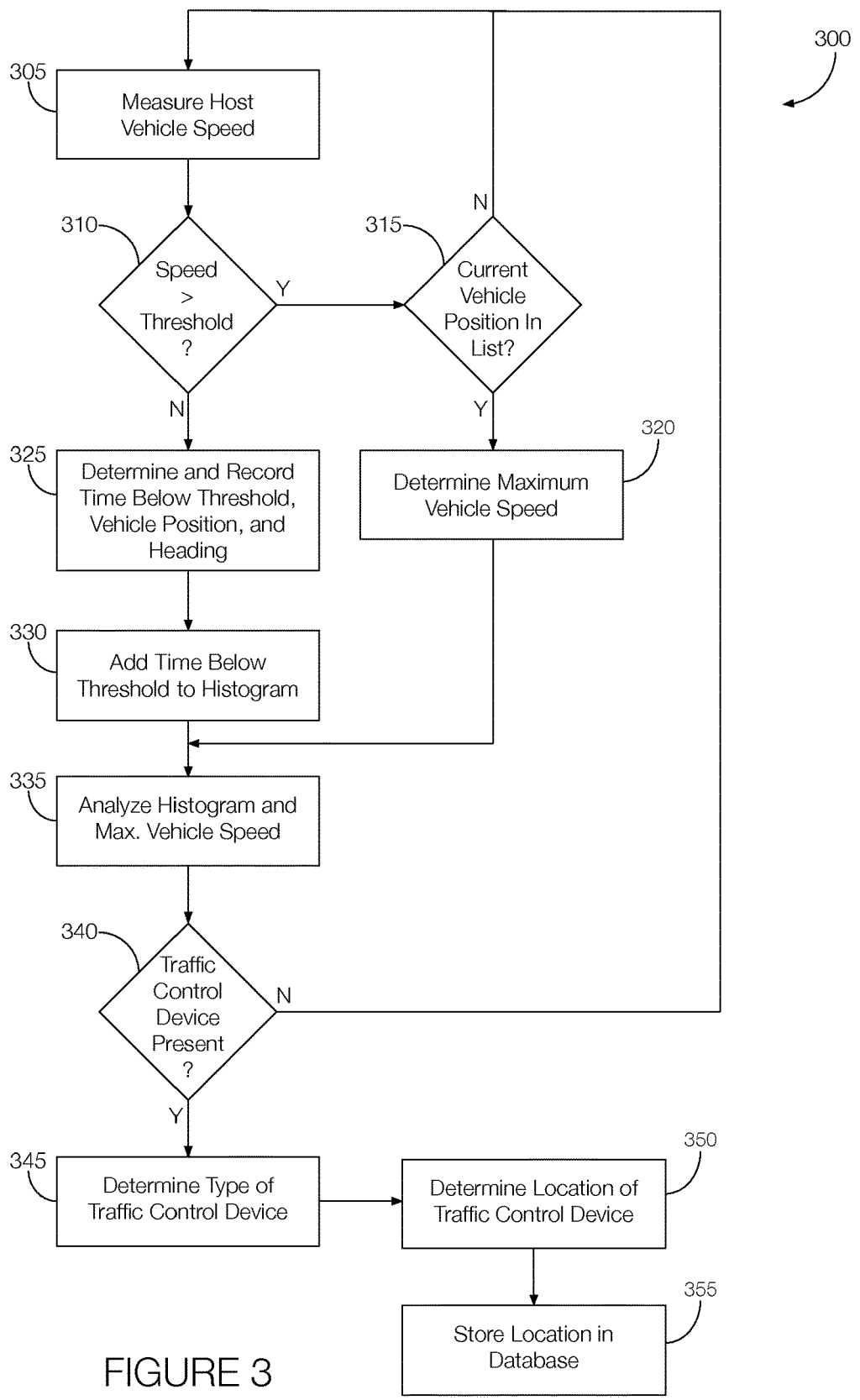
FIG. 3 is a flowchart of an example process that may be executed by the system of FIG. 2 to detect traffic control devices.

FIG. 3 is a flowchart of an example process 300 that may be executed by the system 105 to detect traffic control devices in the path of the host vehicle 100. The process 300 may be initiated when the host vehicle 100 is turned on.

At block 305, the speed sensor 135 may measure a speed of the host vehicle 100. The speed sensor 135 may measure the speed of the host vehicle 100 based on outputs from other sensors such as the speedometer, a wheel speed sensor 135, a sensor measuring engine shaft rotations, etc. Alternatively, the speed sensor 135 may calculate the speed of the host vehicle 100 based on, e.g., signals output by the navigation system 120.

At decision block 310, the processing device 140 may compare the speed measured by the speed sensor 135 to a speed threshold to determine whether the speed is above or below the speed threshold. The speed threshold may be relatively low, such as, e.g., 10 mph or lower. If the measured speed is above the speed threshold, the process 300 may continue at block 315. If the measured speed is below the speed threshold, the process 300 may continue at block 325.

At decision block 315, the processing device 140 may determine whether the current vehicle position is included in the location database. The processing device 140 may query the location database for the current vehicle position. Inclusion in the location database may indicate that a traffic control device is near the host vehicle 100. If the present vehicle location is in the location database, the process 300 may continue at block 320.

At block 320, the processing device 140 may determine the recent maximum vehicle speed of the host vehicle 100. The process 300 may proceed to block 335 once the recent maximum vehicle speed has been determined.

At block 325, the processing device 140 may determine the amount of time the speed is below the speed threshold. For instance, to determine the amount of time below the speed threshold, the processing device 140 may begin incrementing a counter at periodic intervals. The processing device 140 may cease counting when the instantaneous speed exceeds the speed threshold. The amount of time the host vehicle 100 is traveling below the speed threshold may be recorded in the memory device 130 along with other data, such as the current position of the host vehicle 100, the heading of the host vehicle 100, and possibly other data.

At block 330, the processing device 140 may add the amount of time recorded at block 325 to a histogram record stored in the memory device 130. By incorporating the amount of time recorded to a histogram record, the presence of traffic control devices may be detected over time, resulting in fewer false positive traffic control device detections.

At block 335, the processing device 140 may analyze the histogram record and possibly other data, such as the recent maximum vehicle speed, stored in the memory device 130. The processing device 140 may analyze such data to determine whether a traffic control device is present at the current or upcoming location of the host vehicle 100. If block 335 is executed by way of block 330, block 335 may be used to identify the presence of a new traffic control device. If block 335 is executed by way of block 320, however, block 335 may be used to determine that a previously discovered traffic control device has been removed from that location.

At decision block 340, the processing device 140 may determine whether a traffic control device is present. The presence of a traffic control device may be based on the histogram record, e.g., the amount of time the host vehicle 100 travels below the predetermined threshold. Moreover, because the time below the speed threshold is stored in the histogram record, the presence of the traffic control device may be based on an aggregate number of times the processing device 140 has determined that the host vehicle 100 has stopped or slowed down at a particular location for a predetermined minimum number of times. If the traffic control device is detected, the process 300 may continue at block 345. Otherwise, the process 300 may return to block 305.

At block 345, the processing device 140 may determine the type of traffic control device detected. The type of traffic control device may be based on, e.g., the amount of time the speed of the host vehicle 100 was below the predetermined threshold, a recent maximum speed of the host vehicle 100, or both. For instance, if the host vehicle 100 was travelling less than 25 mph and stopped at an intersection for, e.g., a few seconds, the processing device 140 may determine that the host vehicle 100 was stopped by a stop sign. If, however, the host vehicle 100 was travelling approximately 45 mph and stopped at an intersection for, e.g., 30 seconds or so, the processing device 140 may determine that the host vehicle 100 was stopped by a traffic light.

At block 350, the processing device 140 may determine a location of the traffic control device. The location may be determined from the location of the host vehicle 100 at the time the speed of the host vehicle 100 was below the predetermined threshold. The location of the host vehicle 100 may be determined from an output of the navigation system 120, and the processing device 140 may associate the location output by the navigation system 120 to the location of the traffic control device.

At block 355, the processing device 140 may store the location of the traffic control device in the location database. The location database may be stored locally in the on-board memory device 130 of the host vehicle 100 or the remote server 110.

The process 300 may return to block 305 so that additional traffic control devices may be discovered. The process 300 may continue to execute so long as the host vehicle 100 is turned on.

Figure 4:
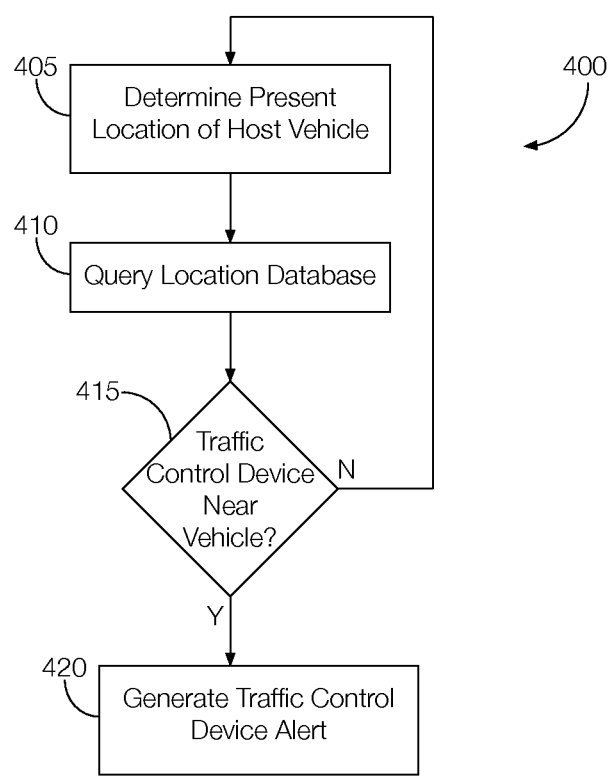
FIG. 4 is a flowchart of an example process that may be executed by the system of FIG. 2 to alert the driver of the host vehicle of an upcoming traffic control device.

FIG. 4 is a flowchart of an example process 400 that may be executed by the system 105 to alert the driver of the host vehicle 100 of an upcoming traffic control device. The process 400 may be initiated when the host vehicle 100 is turned on.

At block 405, the processing device 140 may determine a present location of the host vehicle 100. The present location may be based on signals output by the navigation system 120.

At block 410, the processing device 140 may query the location database for traffic control devices near the host vehicle 100. This may include querying the location database for traffic control devices within a predetermined radius of the host vehicle 100 or along a route generated by the navigation system 120. The processing device 140 may query the location database stored in the on-board memory device 130 or the remote server 110.

At decision block 415, the processing device 140 may determine whether a traffic control device is near the host vehicle 100. The processing device 140 may make such a determination based on the result of the query at block 410. If a traffic control device is near the host vehicle 100, the process 400 may continue at block 420. Otherwise, the process 400 may return to block 405.

At block 420, the processing device 140 may generate and output a traffic control alert. The traffic control alert may be output to the user interface device 115 and presented to the driver. The traffic control alert may, therefore, warn the driver of the upcoming traffic control device.

The process 400 may return to block 405 after the driver has been alerted of the upcoming traffic control device. The process 400 may continue to execute until the vehicle is turned off.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a speed sensor configured to measure a speed of a host vehicle and output a signal representing the speed of the host vehicle; and
an on-board processing device programmed to receive a signal representing the speed of the host vehicle output by the speed sensor, determine an amount of time the speed of a host vehicle is below a speed threshold, and detect a presence of a traffic control device based on the amount of time the speed is below the speed threshold,
wherein the on-board processing device is further programmed to determine a type of traffic control device based on a recent maximum speed of the host vehicle and the amount of time the speed of the host vehicle is below the speed threshold, wherein the recent maximum speed of the host vehicle is greater than zero.

2. The vehicle system of claim 1, further comprising a navigation system programmed to determine a location of the host vehicle, wherein the on-board processing device is programmed to associate the location of the host vehicle to the presence of the traffic control device.

3. The vehicle system of claim 1, wherein the on-board processing device is programmed to determine a location of the traffic control device based at least in part on a location of the host vehicle.

4. The vehicle system of claim 3, wherein the on-board processing device is programmed to store the location of the traffic control device in a location database.

5. The vehicle system of claim 1, further comprising a user interface device configured to present a traffic control alert as the host vehicle approaches the traffic control device.

6. The vehicle system of claim 5, wherein the on-board processing device is programmed to command the user interface device to present the traffic control alert when the host vehicle is near the traffic control device.

7. A method comprising:
measuring, via a speed sensor, a speed of a host vehicle;
comparing, via the on-board processing device, the speed to a speed threshold;
determining an amount of time the speed is below the speed threshold;
detecting, at the host vehicle, a presence of a traffic control device based on the amount of time the speed is below the speed threshold; and
determining a type of traffic control device based on both of a recent maximum speed of the host vehicle and the amount of time the speed of the host vehicle is below the speed threshold, wherein the recent maximum speed of the host vehicle is greater than zero.

8. The method of claim 7, further comprising determining a location of the host vehicle.

9. The method of claim 8, further comprising associating the location of the host vehicle to the presence of the traffic control device.

10. The method of claim 7, further comprising determining a location of the traffic control device based at least in part on a location of the host vehicle.

11. The method of claim 10, further comprising storing the location of the traffic control device in a location database.

12. The method of claim 7, further comprising presenting a traffic control alert presented via a user interface device when the host vehicle is near the traffic control device.

13. A vehicle system comprising:
a speed sensor configured to measure a speed of a host vehicle;
an on-board processing device programmed to compare the speed to a speed threshold and determine an amount of time the speed is below the speed threshold; and
a navigation system programmed to determine a location of the host vehicle;
wherein the on-board processing device is programmed to detect a presence of a traffic control device based on the amount of time the speed is below the speed threshold, and determine a location of the traffic control device based on the location of the host vehicle,
wherein the on-board processing device is further programmed to determine a type of traffic control device based on a recent maximum speed of the host vehicle and the amount of time the speed of the host vehicle is below the speed threshold and store the presence and type of traffic control device in a location database, wherein the recent maximum speed of the host vehicle is greater than zero.

14. The vehicle system of claim 1, wherein the on-board processing device is further programmed to detect an absence of a previously present traffic control device based on the amount of time the speed is below the speed threshold at a location of the previously present traffic control device.

15. The vehicle system of claim 1, wherein the speed threshold is greater than zero.

16. The vehicle system of claim 2, wherein the on-board processing device is programmed to record, in a histogram record, the amount of time the speed is below the speed threshold and record the location of the host vehicle at the time the speed is below the speed threshold, and wherein the on-board processing device is further programmed to detect the presence of the traffic control device based on the amount of time the speed is below the speed threshold and the location of the host vehicle at the time is below the speed threshold.

17. The vehicle system of claim 4, wherein the on-board processing device is programmed to update the location database after a traffic control device is removed from the location.

* * * * *